Patented Feb. 24, 1942

2,274,544

UNITED STATES PATENT OFFICE 2,274,544

PRINTING OF TEXTILE FABRICS

Ivan Gubelmann, Wilmington, Del., assignor to E. I. du Pont de Nemours & Company, Wilmington, Del., a corporation of Delaware No Drawing. Application September 13, 1940, Serial No. 356,649

9 Claims. (Cl. 8—62)

This invention relates to the printing of textiles wherein water-solubilized derivatives of insoluble dyes are used as the dyestuff ingredient of the printing pastes, the solubilizing groups being acyl groups of a kind which can be hydrolyzed off by chemical reagents after the dyestuff derivative is applied to the fabric, thereby regenerating the insoluble dye and producing an insoluble dyeing; and especially to improvements in the printing compositions containing such dyestuffs and to processes.

The solubilized derivatives of the insoluble dyes are condensation products which are represented by the general formula R—M in which R is the radical of the insoluble dye, such as an insoluble azo, nitro, anthraquinone, triphenylmethane, azine or oxazine dye. It contains at least one group of the class consisting of hydroxy and imino (i. e. an —NH— group) that is capable of being condensed with a water-solubilizing acyl group. The symbol M represents the radical of the water-solubilizing acyl group. It must be capable of being hydrolyzed off by the action of alkalies after the condensation product is applied to the fiber. The symbol R represents the radical of any insoluble dye of the kind described, such as an insoluble azo, nitro, anthraquinone, triphenylmethane, azine or oxazine dye. The subsequent saponification splits off the acyl group, regenerates the insoluble dye on the fiber and eventually produces superior fastness properties.

The solubilized derivatives, R—M are used in their aqueous solutions or suspensions to produce dyeings or printings on desired materials as by dyeing, padding or printing by known methods. The dyeing is then subjected to a saponifying treatment as with alkaline reagents, such as solutions of ammonia, sodium carbonate, caustic soda, or trisodium phosphate. Upon saponification of the acyl group, the initially soluble acylated derivative of the insoluble or sparingly soluble dye becomes fixed on the fiber as an insoluble dyeing. The simplest forms of such dye derivatives contain only one M— group but more than one may be present.

Heretofore difficulty has been encountered in producing fully satisfactory strong and bright prints from printings made with such solubilized dyestuffs. Consequently many of the otherwise valuable properties of the dyes have not been made fully available in printing practices. In printing with this type of dyes it was also known that some kind of a printing assistant was desirable in the printing paste in order to produce desirable dyeings with such dyestuffs, but the known operable assistants were relatively high molecular weight compounds, often technically difficult and costly to manufacture in good yield. The printing of textiles with these colors was not entirely satisfactory for reasons such as cost of the assistants, stability of the printing compositions, difficulty of manipulation in making the printing paste or by reason of some disadvantageous property which the assistant imparted to the printing paste or printed textile, such as an unpleasant odor. Consequently many of the valuable properties of the dyes had not been made available and improvements were desirable.

It is among the objects of this invention to provide brighter prints upon textiles which are printed with such solubilized dye derivatives, than have hitherto been possible. Another object is to provide stronger prints from a given amount of dye derivative. Another object is to avoid the use of costly assistants and those which have an unpleasant odor. A further object is to provide new printing pastes and processes. Still other objects of the invention will be apparent from the following description.

The objects of this invention are accomplished in general by incorporating into a solution or printing paste containing the water-solubilized dyestuff of the kind described, an assistant from the group consisting of the mono-hydroxy-mononitro saturated aliphatic hydrocarbons containing 2 to 4 carbon atoms and the polyhydroxy-mononitro saturated aliphatic hydrocarbons containing 3 to 6 carbon atoms and 2 to 3 hydroxy groups. The class is represented by the general formula

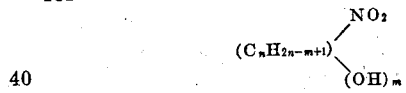

in which $n$ is 2 to 6 and $m$ is 1 to 3 but less than $n$, and where $m$ is 1 then $n$ is not greater than 4 and where $m$ is greater than 1, $n$ is at least 3.

The invention will be more fully set forth in the following more detailed description which includes examples that are given as illustrative embodiments of the invention and not as limitations thereof. Parts are expressed in parts by weight unless otherwise noted.

Example I

Six grams of the product prepared by the action of benzoic-acid-m-sulfon chloride on the azo dye obtained by coupling diazotized 2-amino-4-chloro-diphenyl-ether to the anilide of 2-hydroxy-3-naphthoic acid were dissolved in a mixture of 20 cc. of water and 18 grams of 2-nitro-2-methyl-propane-1,3-diol. To this was added 50 g. of starch-tragacanth thickening and 6 g. of a 20% solution of tri-sodium-phosphate. The paste was mixed thoroughly and printed from an engraved roll onto cotton cloth. The cloth was dried thoroughly in a hot air drier and aged for 10 minutes in a rapid ager of the Mather-Platt type. The print was immersed for 5 minutes in a cold solution containing 15 grams per liter of barium chloride, 50 g. per liter of common salt and 30 cc. of a 36° Bé. caustic soda solution. The print was removed from this solution and neutralized by treating it for 3 minutes at 140° F. in a bath containing 5 cc. per liter of a 37% hydrochloric acid solution. The print was then rinsed, soaped 5 minutes at 160° F. and dried in a hot air drier.

A red print was obtained which was much brighter and stronger than a print which was obtained in the same way from a similar paste which did not contain the nitro compound. It was also stronger than a print obtained from a similar paste in which 18 g. of thio-diglycol were used as printing assistant instead of 18 g. of 2-nitro-2-methyl-propane-1,3-diol.

*Example II*

Cotton cloth was printed with a paste having the following composition by weight:

| | Parts |
|---|---|
| The product prepared by the action of benzoic-acid-m-sulfon-chloride on the dye obtained by the condensation of two moles of beta-amino-anthraquinone and one mole of aniline with one mole of cyanuric chloride | 6 |
| 2-nitro-2-methyl-propane-1,3-diol | 18 |
| Water | 20 |
| Starch-tragacanth thickening | 50 |
| 20% tri-sodium-phosphate solution | 6 |

The printed cloth was finished as described in Example I. A yellow print was formed. The print had better strength and brilliance than a print which was obtained in the same way from a similar paste which did not contain an assistant. It also had better strength than a print obtained from a similar paste which contained an equal amount of thio-diglycol as assistant in place of the 2-nitro-2-methyl-propane-1,3-diol.

*Example III*

A printing paste having the following composition was printed from an engraved roll upon cotton cloth:

| | Parts |
|---|---|
| The product obtained by the reaction of benzoic-acid-m-sulfon-chloride on the azo dye prepared by coupling diazotized m-chlor-aniline with the o-toluidide of 2-hydroxy-naphthoic acid | 6 |
| 2-nitro-2-methyl-propane-1,3-diol | 18 |
| Water | 20 |
| Starch-tragacanth thickener | 50 |
| 20% tri-sodium-phosphate solution | 6 |

The cloth was finished as described in Example I. A bright, strong orange print was obtained, which was superior to that obtained in the same way from a paste which contained no assistant, and it was very much stronger than a print made using thio-diglycol as assistant in place of the 2-nitro-2-methyl-propane-1,3-diol.

*Example IV*

Cotton cloth was printed with a mixture having the following composition:

| | Parts |
|---|---|
| The product obtained by the reaction of benzoic-acid-m-sulfon chloride on the azo dye obtained by coupling diazotized 4-benzoyl-amino-2,5-diethoxy-aniline to the anilide of 2-hydroxy-3-naphthoic acid | 6 |
| 2-nitro-2-methyl-propane-1,3-diol | 18 |
| Water | 20 |
| Starch-tragacanth thickener | 50 |
| 20% solution of tri-sodium-phosphate | 6 |

After finishing exactly as described in Example I, there was obtained a blue print with strength and brilliance superior to that obtained in the same way by printing with a similar paste which contained no assistant. The print was also brighter than was obtained by the use of an equal weight of thio-diglycol in place of the 2-nitro-2-methyl-propane-1,3-diol.

*Example V*

Six grams of the product prepared by the action of benzoic-acid-m-sulfon chloride on the azo dye obtained by coupling diazotized 2-amino-4-chloro-diphenyl-ether to the anilide of 2-hydroxy-3-naphthoic acid were dissolved in a mixture of 18 grams of tri-methylol-nitro-methane and 20 cc. of water. To this was added 50 g. of starch-tragacanth thickener and 6 g. of 20% tri-sodium-phosphate solution. The paste was mixed thoroughly and printed from an engraved roll upon cotton cloth. The cloth then was dried in a hot air drier, aged for 10 minutes in a rapid ager of the Mather-Platt type, immersed for 5 minutes in a cold bath containing 15 grams per liter of $BaCl_2$, 50 g. NaCl and 30 cc. of a 36° Bé. caustic soda solution, then immersed for 3 minutes at 140° F. in a bath containing 5 cc. of 37% hydrochloric acid per liter. It was then rinsed, soaped and dried. A red print was obtained which had superior strength and brilliance as compared to that obtained by printing in the same way with a like paste except that it did not contain the nitro compound as assistant.

*Example VI*

Cotton cloth was printed with a paste having the following composition by weight:

| | Parts |
|---|---|
| The product obtained by the reaction of benzoic-acid-m-sulfon-chloride upon the azo dye prepared by coupling diazotized m-chloraniline with the o-toluidide of 2-hydroxy-3-naphthoic acid | 6 |
| 2-nitro-2-ethyl-propane-1,3-diol | 18 |
| Water | 20 |
| Starch-tragacanth thickening | 50 |
| 20% tri-sodium-phosphate solution | 6 |

The printed cloth was finished as described in Example I. An orange print was formed which had better strength and brilliance than a print which was obtained in the same way from a similar paste which did not contain an assistant. It also was much stronger than a print obtained from a similar paste which contained an equal amount of thio-diglycol as assistant in place of the 2-nitro-2-ethyl-propane-1,3-diol.

Example VII

Cotton cloth was printed with a paste having the following composition by weight:

| | Parts |
|---|---|
| The product of the action of benzoic-acid-m-sulphon-chloride upon the azo dye obtained by coupling diazotized 2-amino-4-chloro-diphenyl-ether to the anilide of 2-hydroxy-3-naphthoic acid | 6 |
| 2-nitro-2-ethyl-propane-1,3-diol | 18 |
| Water | 20 |
| Starch-tragacanth thickening | 50 |
| 20% tri-sodium-phosphate solution | 6 |

The printed cloth was finished as described in Example I. A red print was obtained which had better strength and brilliance than a print which was obtained in the same way from a similar paste which contained no assistant. It also had better strength than a print obtained from a similar paste which contained an equal amount of thio-diglycol assistant in place of the 2-nitro-2-ethyl-propane-1,3-diol.

Example VIII

| | Parts |
|---|---|
| The product of the reaction of benzoic-acid-m-sulfon-chloride upon the azo dye 3-nitro-4-amino-anisole→the o-anisidide of 2-hydroxy-3-naphthoic acid | 1.5 |
| 2-nitro-2-ethyl-propane-1,3-diol | 18 |
| Water | 24.5 |
| Starch-tragacanth thickening | 50 |
| 20% tri-sodium-phosphate solution | 6 |

The printed cloth was finished as described in Example I. There was obtained a Bordeaux print which was much stronger and brighter than a print which was obtained in the same way from a similar paste which did not contain an assistant. It also was stronger than a print obtained from a similar paste which contained an equal amount of thio-diglycol in place of the 2-nitro-2-ethyl-propane-1,3-diol.

The assistants must be at least partially miscible with water so that they can be incorporated successfully into the hydrous printing paste. As illustrative of the many compounds of the class which have been found to operate successfully as assistants when used with the described class of dyes as set forth in the foregoing examples are mentioned the mono-nitro derivatives of the aliphatic monohydric alcohols having 2 to 4 carbons, such as 2-nitro-ethanol-1, 2-nitro-propanol-1, 2-nitro-2-methyl-propanol-1, 2-nitro-butanol-3, 2-nitro-butanol-1, 1-nitro-butanol-2, and mono-nitro-dihydroxy saturated aliphatic hydrocarbons, such as 2-nitro-propane-1,3-diol, 2-nitro-butane-1,3-diol, 2-nitro-2-methyl-butane-1,3-diol and 2-nitro-3-methyl-2-methylol-butanol-1.

As other illustrations of water-solubilized derivatives of insoluble dyes having the formula R—M as hereinbefore described and which give improved results when used with the assistants described herein are the product of the reaction between benzoic-acid-m-sulfon-chloride and the azo dye alpha naphthylamine→beta-naphthol, the product of the reaction between benzoic-acid-3:5-disulfon-chloride and the azo dye benzidine=>(beta-naphthol)$_2$, the product of the reaction between benzoic-acid-m-sulfon-chloride and the azo dye p-anisidine→cresol, the product of the reaction between benzoic-acid-m-sulfon-chloride and the azo dye 4-chloro-2-amino-toluene→2':3'-hydroxy-naphthoyl-2-amino-4-methoxy-toluene, the product of the reaction between benzoic-acid-m-sulfon-chloride and the azo dye 4-chloro-2-amino-anisole→2':3'-hydroxy-naphthoyl-2-amino-anisole, the product of the action of benzoic-acid-m-sulfon-chloride upon the azo dye 4-nitro-2-amino-toluene→2:3-hydroxy-naphthoic-acid-anilide, the product obtained by the action of benzoic-acid-3:5-disulfon-chloride upon 1:5-di-(benzoyl-amino)-4:8-dihydroxy-anthraquinone, the product obtained by the action of 4-chloro-methyl-benzoyl-chloride in pyridine solution upon the azo dye 2-methyl-4:4'-diamino-5-methoxy-azo-benzene=>(beta-naphthol)$_2$, the product obtained by the action of benzoic-acid-disulfon-chloride upon the azo dye xylidine→2-(m-amino-benzoyl-amino)-5-hydroxy-naphthalene-7-sulfonic acid→beta-naphthol, the product of the reaction in pyridine between 4-chloro-methyl-benzoyl-chloride and the azo dye alpha-naphthylamine→beta-naphthol)$_2$ the product of the reaction of benzoic-acid-3:5-disulfon-chloride upon the azo dye aniline→2:4-dihydroxy-quinoline, the product of the reaction of benzoic-acid-3:5-disulfon-chloride upon the azo dye 4:4'-diamino-diphenyl-urea=>(beta-naphthol)$_2$ the product of the reaction of benzoic-acid-m-sulfon-chloride upon the azo dye 4:4'-diamino-diphenylamine=>(beta-naphthol)$_2$ the product of the reaction of benzoic acid-3:5-disulfon-chloride upon 1-hydroxy-4-(p-tolyl-amino)-anthraquinone, the product of the reaction in pyridine between 4-(chloro-methyl)-benzoyl chloride upon dihydroxy-N-dihydro-1:2:2':1'-anthraquinone-azine, the product of the reaction in pyridine between 4-(chloro-methyl)-benzoyl-chloride and Erichrome Azurol (Color Index No. 720), the product of the reaction in pyridine between 4-(chloro-methyl)-benzoyl-chloride and Modern Violet (Color Index No. 892), and the products made by condensing 1 mole of cyanuric chloride with any of the following combinations, namely:

Two moles of 1- or 2-amino-anthraquinone and one mole of ammonia,

Two moles of 2-amino-anthraquinone and one mole of ethylamine,

Two moles of 2-amino-anthraquinone and one mole of para toluidine,

Two moles of 2-amino-anthraquinone and one mole of alpha naphthylamine,

Two moles of 2-amino-anthraquinone and one mole of beta naphthylamine,

Two moles of 2-amino-anthraquinone and one mole of mono-amylamine,

One mole of 1-amino-anthraquinone and two moles of aniline or

Two moles of 1-amino-4-methoxy-anthraquinone and one mole of ammonia.

As illustrations of other acyl groups which can be used instead of those mentioned in the foregoing examples for the purpose of solubilizing the described insoluble dyes and which are capable of being hydrolyzed off by similar means after the solubilized dyes are applied to the fiber are mentioned the acyl groups corresponding to the following acids: benzene-1,3-disulfonic acid, naphthalene-1,3,6-trisulfonic acid, naphthalene-1,5-disulfonic acid, benzene-1,3,5-tricarboxylic acid, benzene-hexa-carboxylic acid, toluene-2,4-disulfonic acid, sulfo-acetic acid, sulfobutyric acid, the condensation product of 4-(chloromethyl)-benzoyl chloride and pyridine, and many others of the kind. The described type of assistants give improved results which are similar to those heretofore described with the dyes which are solubilized with such solubilizing agents.

The mono-nitro hydroxy saturated aliphatic hydrocarbons of the described class have a marked beneficial effect on the brightness and strength of the prints which are made with the described class of dyestuffs. It is possible that the assistants have a swelling effect on the fiber and thereby cause better penetration of the dyestuff or that the assistants affect the particle size of the insoluble dye which is developed on the fiber by saponification of the acyl group, but the reasons for the improved results are not understood and no limitations of the invention are intended by the proposed theories.

A noticeable effect in the brilliance and strength of the prints is produced when the printing paste contains at least a significant amount of assistant, say about 1%. Any significant amount of assistant can be present. However, more than about 30% in the printing paste is generally excessive. Excessive amounts can be present but they are unnecessary. The preferred kind and proportion of assistant in the hydrous printing paste is about 7% to 20% by weight of a compound represented by the formula

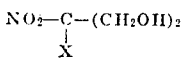

where X is one of a group consisting of methyl, ethyl and hydroxy-methyl, namely 2-nitro-2-methyl-propane-1,3-diol, 2-nitro-2-ethyl-propane-1,3-diol and tri-methylol-nitromethane.

The proportion of dye derivative in the paste can be varied over a wide range according to the depth of shade desired in the final print. More or less of the dye derivative per unit of printing paste generally produces a greater or less depth of shade as the case may be. Any proportion of dyestuff which is sufficient to give a print can be used.

The starch tragacanth thickening used in the foregoing illustrations was made as follows: 80 parts of wheat starch, 360 parts of a 6% aqueous solution of gum tragacanth and 510 parts of water were mixed, heated to the boiling point and held at this temperature for 15 minutes. The plate was then cooled to room temperature and mixed with 50 parts of glycerine.

Any amount or kind of thickening agent can be used which will give the printing paste a viscosity which is suitable for printing. Any of the materials useful for making thickening agents for printing pastes can be used instead of starch and tragacanth, such as starch, locust bean gum, gum karaya, gum tragacanth, gum arabic, dextrin, agar, vegetable colloid and various mixtures of these materials. More or less of the thickening agent will be required in order that the printing paste will have a suitable viscisity to operate satisfactorily on the etched roller or other printing device. The proportion can be widely varied and determined by experiment according to various circumstances, such as the characteristics of the printing member and the material upon which the prints are to be disposed.

The printing paste preferably contains an alkaline buffer, especially when the paste is not to be used within a relatively short time after it is prepared. Such a buffer as recited in the examples is optional when the paste is to be used immediately after it is made. When present, the alkaline buffer is present in sufficient amount to prevent the paste becoming acid to litmus and should be insufficient to hydrolyze the dye derivative before the paste is applied to the fabric. The paste is operable without an alkaline buffer, but for optimum results and in cases where the paste is not used soon after it is prepared, the alkaline buffer is desirable. Any alkaline buffer for printing pastes can be used instead of tri-sodium phosphate, such as other alkali-metal phosphates and the alkali-metal carbonates.

In the foregoing illustrations the prints were produced on cotton cloth but the invention is not restricted to cotton fibers. The invention is applicable to all dyeable fabrics which are susceptible to dyeing with the described class of dyes. A wide variety of fibers such as linen, jute, ramie, regenerated cellulose, cellulose esters and ethers, wool, silk, mixtures of these fibers and the like can be used. Wide variations can be made in the finishing process. For example, any strong alkaline reagent which is sufficient in concentration to saponify the acyl group of the dye derivative on the fiber and yield the insoluble azo dye can be used. The desired saponifying agent can be selected in view of the kind of fiber dyed, the speed of saponification desired and other variables. In like manner the final acid treatment, the time and temperature of treatment and the concentrations of reagents can be selected over a wide range.

The printing pastes containing the water-solubilized derivatives of the described class of dyes and the described class of assistants produce brighter and stronger prints from a given quantity of dyestuff than can be obtained without the assistants. The improved results are obtained without the use of compounds having an unpleasant and persistent odor, undesirable instability and other disadvantages. Wide variations can be made in the process, such as the use of any of the various alkalies commonly used for the stabilization and saponification of the dyestuff and other suitable organic or inorganic acids can be used instead of hydrochloric acid in the finishing process. It is to be understood that variations in the time, temperatures of treatment and concentrations of the several constituents can be made without departing from the invention.

From the foregoing disclosure it will be recognized that the invention is suceptible of modification without departing from the spirit and scope thereof and it is to be understood that the invention is not restricted to the specific illustrations herein set forth.

I claim:

1. A hydrous printing paste which comprises a thickener which is sufficient to make the paste suitably viscous for printing; a water-soluble condensation product of a substantially insoluble dye which is represented by the formula R—M in which R is the radical of an insoluble dye which contains at least one condensible group of the class consisting of hydroxy and imino and M is an acyl radical which is connected to the residue of said condensible group, said acyl group being capable of rendering the dye water-soluble and of being hydrolyzed off and thereby of regenerating the insoluble dye by the action of an alkaline agent after the solubilized dyestuff is applied to the fiber; and an assistant consisting of a significant amount of a mono-nitro-hydroxy saturated aliphatic hydrocarbon represented by the formula

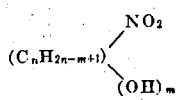

in which the nitro and hydroxy groups are attached to different carbon atoms, $n$ is 2 to 6, $m$ is 1 to 3 but less than $n$, where $m$ is 1 then $n$ is not greater than 4 and where $m$ is greater than 1, $n$ is at least 3.

2. A hydrous printing paste which comprises a thickener which is sufficient to make the paste suitably viscous for printing; a water-soluble condensation product of a substantially insoluble dye which is represented by the formula R—M in which R is the radical of an insoluble dye which contains at least one condensible group of the class consisting of hydroxy and imino and M is an acyl radical which is connected to the residue of said condensible group, said acyl group being capable of rendering the dye water-soluble and of being hydrolyzed off and thereby of regenerating the insoluble dye by the action of an alkaline agent after the solubilized dyestuff is applied to the fiber; an assistant consisting of a significant amount of a mono-nitro-hydroxy saturated aliphatic hydrocarbon represented by the formula

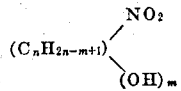

in which the nitro and hydroxy groups are attached to different carbon atoms, $n$ is 2 to 6, $m$ is 1 to 3 but less than $n$, where $m$ is 1 then $n$ is not greater than 4 and where $m$ is greater than 1, $n$ is at least 3; and at least sufficient of an alkaline buffer to prevent the paste from becoming acid but insufficient to hydrolyze said water-soluble condensation product before it is applied to the fiber.

3. A hydrous printing paste which comprises a thickener which is sufficient to make the paste suitably viscous for printing; a water-soluble condensation product of a substantially insoluble dye which is represented by the formula R—M in which R is the radical of an insoluble dye which contains at least one condensible group of the class consisting of hydroxy and imino and M is an acyl radical which is connected to the residue of said condensible group, said acyl group being capable of rendering the dye water-soluble and of being hydrolyzed off and thereby of regenerating the insoluble dye by the action of an alkaline agent after the solubilized dyestuff is applied to the fiber; an assistant consisting of about 1% to about 30% of a mono-nitro-hydroxy saturated aliphatic hydrocarbon represented by the formula

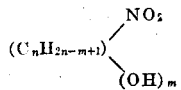

in which the nitro and hydroxy groups are attached to different carbon atoms, $n$ is 2 to 6, $m$ is 1 to 3 but less than $n$, where $m$ is 1 then $n$ is not greater than 4 and where $m$ is greater than 1, $n$ is at least 3; and at least sufficient of an alkaline buffer to prevent the paste from becoming acid but insufficient to hydrolyze said water-soluble condensation product before it is applied to the fiber.

4. A hydrous printing paste which comprises a thickener which is sufficient to make the paste suitably viscous for printing; a water-soluble condensation product of a substantially insoluble dye which is represented by the formula R—M in which R is the radical of an insoluble dye which contains at least one condensible group of the class consisting of hydroxy and imino and M is an acyl radical which is connected to the residue of said condensible group, said acyl group being capable of rendering the dye water-soluble and of being hydrolyzed off and thereby of regenerating the insoluble dye by the action of an alkaline agent after the solubilized dyestuff is applied to the fiber; an assistant consisting of about 7% to about 20% of a mono-nitro-hydroxy saturated aliphatic hydrocarbon represented by the formula

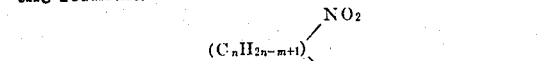

in which the nitro and hydroxy groups are attached to different carbon atoms, $n$ is 2 to 6, $m$ is 1 to 3 but less than $n$, where $m$ is 1 then $n$ is not greater than 4 and where $m$ is greater than 1, $n$ is at least 3; and at least sufficient of an alkaline buffer to prevent the paste from becoming acid but insufficient to hydrolyze said water-soluble condensation product before it is applied to the fiber.

5. A hydrous printing paste which comprises a thickener which is sufficient to make the paste suitably viscous for printing; a water-soluble condensation product of a substantially insoluble dye which is represented by the formula R—M in which R is the radical of an insoluble dye which contains at least one condensible group of the class consisting of hydroxy and imino and M is an acyl radical which is connected to the residue of said condensible group, said acyl group being capable of rendering the dye water-soluble and of being hydrolyzed off and thereby of regenerating the insoluble dye by the action of an alkaline agent after the solubilized dyestuff is applied to the fiber; and an assistant consisting of about 7% to about 20% of a mono-nitro-hydroxy saturated aliphatic compound represented by the formula

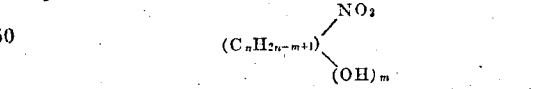

in which the nitro and hydroxy groups are attached to different carbon atoms, $n$ is 2 to 6, $m$ is 1 to 3 but less than $n$, where $m$ is 1 then $n$ is not greater than 4 and where $m$ is greater than 1, $n$ is at least 3.

6. A hydrous printing paste which comprises a thickener which is sufficient to make the paste suitably viscous for printing; a water-soluble condensation product of a substantially insoluble dye which is represented by the formula R—M in which R is the radical of an insoluble dye which contains at least one condensible group of the class consisting of hydroxy and imino and M is an acyl radical which is connected to the residue of said condensible group, said acyl group being capable of rendering the dye water-soluble and of being hydrolyzed off and thereby of regenerating the insoluble dye by the action of an alkaline agent after the solubilized dyestuff is applied to the fiber; and about 7% to about 20% of 2-nitro-2-methyl-propane-1,3-diol.

7. A hydrous printing paste which comprises a thickener which is sufficient to make the paste suitably viscous for printing; a water-soluble condensation product of a substantially insoluble dye which is represented by the formula R—M in which R is the radical of an insoluble dye which contains at least one condensible group of the class consisting of hydroxy and imino and M is an acyl radical which is connected to the residue of said condensible group, said acyl group being capable of rendering the dye water-soluble and of being hydrolyzed off and thereby of regenerating the insoluble dye by the action of an alkaline agent after the solubilized dyestuff is applied to the fiber; and about 7% to about 20% of 2-nitro-2-ethyl-propane-1,3-diol.

8. A hydrous printing paste which comprises a thickener which is sufficient to make the paste suitably viscous for printing; a water-soluble condensation product of a substantially insoluble dye which is represented by the formula R—M in which R is the radical of an insoluble dye which contains at least one condensible group of the class consisting of hydroxy and imino and M is an acyl radical which is connected to the residue of said condensible group, said acyl group being capable of rendering the dye water-soluble and of being hydrolyzed off and thereby of regenerating the insoluble dye by the action of an alkaline agent after the solubilized dyestuff is applied to the fiber; and about 7% to about 20% of trimethylol-nitro-methane.

9. The process which comprises printing on a dyeable textile material with a printing paste which contains a thickener which is sufficient to make the paste suitably viscous for printing; a water-soluble condensation product of a substantially insoluble dye which is represented by the formula R—M in which R is the radical of an insoluble dye which contains at least one condensible group of the class consisting of hydroxy and imino and M is an acyl radical which is connected to the residue of said condensible group, said acyl group being capable of rendering the dye water-soluble and of being hydrolyzed off and thereby of regenerating the insoluble dye by the action of an alkaline agent after the solubilized dyestuff is applied to the fiber; and an assistant consisting of a significant amount of a mono-nitro-hydroxy saturated aliphatic hydrocarbon represented by the formula

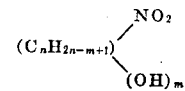

in which the nitro and hydroxy groups are attached to different carbon atoms, $n$ is 2 to 6, $m$ is 1 to 3 but less than $n$, where $m$ is 1 then $n$ is not greater than 4 and where $m$ is greater than 1, $n$ is at least 3; and subjecting the print to a saponification agent until a dyeing of said insoluble dye is produced.

IVAN GUBELMANN.